(12) United States Patent
Paulraj et al.

(10) Patent No.: US 12,481,915 B2
(45) Date of Patent: Nov. 25, 2025

(54) GOVERNANCE MECHANISMS FOR REUSE OF MACHINE LEARNING MODELS AND FEATURES

(71) Applicant: AT&T INTELLECTUAL PROPERTY I, L.P., Atlanta, GA (US)

(72) Inventors: Prince Paulraj, Coppell, TX (US); Christopher Kim, Plano, TX (US); Eric Zavesky, Austin, TX (US); Prathiba Sugumaran, Parsippany, NJ (US); James Pratt, Round Rock, TX (US); Cuong Vo, Sachse, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1002 days.

(21) Appl. No.: 17/646,708

(22) Filed: Dec. 31, 2021

(65) Prior Publication Data
US 2023/0214711 A1 Jul. 6, 2023

(51) Int. Cl.
| | |
|---|---|
| G06F 16/00 | (2019.01) |
| G06F 8/36 | (2018.01) |
| G06F 8/71 | (2018.01) |
| G06F 16/23 | (2019.01) |
| G06F 21/60 | (2013.01) |
| G06N 20/00 | (2019.01) |

(52) U.S. Cl.
CPC .............. *G06N 20/00* (2019.01); *G06F 8/36* (2013.01); *G06F 8/71* (2013.01); *G06F 16/2379* (2019.01); *G06F 21/60* (2013.01)

(58) Field of Classification Search
CPC .................................................. G06F 16/2379
See application file for complete search history.

(56) References Cited

U.S. PATENT DOCUMENTS

| | | | |
|---|---|---|---|
| 12,079,502 B2* | 9/2024 | Grunwald | G06F 3/0658 |
| 2018/0096267 A1* | 4/2018 | Masekera | G06Q 10/06 |
| 2020/0265324 A1* | 8/2020 | Ferreira Moreno | G06N 5/022 |
| 2021/0034602 A1* | 2/2021 | Levacher | G06F 16/2365 |
| 2021/0319348 A1* | 10/2021 | Calmon | G06N 7/01 |
| 2021/0357508 A1* | 11/2021 | Elovici | G06F 11/3612 |
| 2022/0012591 A1* | 1/2022 | Dalli | G06N 3/082 |
| 2022/0141298 A1* | 5/2022 | Dawicki | G06N 20/00 709/224 |
| 2022/0172099 A1* | 6/2022 | Das | G06N 20/00 |
| 2022/0207349 A1* | 6/2022 | Fusco | G06N 20/00 |
| 2022/0215111 A1* | 7/2022 | Ekins | G06F 21/6218 |
| 2023/0031691 A1* | 2/2023 | Carroll | G06N 3/045 |

(Continued)

OTHER PUBLICATIONS

Vo et al., " Reuse of Machine Learning Models", U.S. Appl. No. 17/486,798, filed Sep. 27, 2021.

(Continued)

*Primary Examiner* — Noosha Arjomandi

(57) ABSTRACT

A method performed by a processing system including at least one processor includes detecting that new data has been added to a repository of reusable machine learning models and machine learning model features, applying data protection to the new data, testing the new data for bias, merging at least a portion of the new data with stored data from the repository to build a new machine learning model in which the data protection is preserved, and publishing the new machine learning model in the repository.

20 Claims, 3 Drawing Sheets

(56) References Cited

U.S. PATENT DOCUMENTS

| | | | |
|---|---|---|---|
| 2023/0099502 A1* | 3/2023 | Fix | G06N 5/022 |
| | | | 706/12 |
| 2023/0191608 A1* | 6/2023 | Horowitz | B25J 9/163 |
| | | | 700/245 |
| 2023/0214711 A1* | 7/2023 | Paulraj | G06F 21/60 |
| | | | 706/12 |
| 2023/0396592 A1* | 12/2023 | Sawaya | H04L 63/029 |

OTHER PUBLICATIONS

Fix et al., " Automatic Discovery of Machine Learning Model Features", U.S. Appl. No. 17/486,770, filed Sep. 27, 2021.

* cited by examiner

300

GOVERNANCE MECHANISMS FOR REUSE OF MACHINE LEARNING MODELS AND FEATURES

The present disclosure relates generally to machine learning, and relates more particularly to devices, non-transitory computer-readable media, and methods for vetting machine learning models and features for reuse.

BACKGROUND

Machine learning is a subset of artificial intelligence encompassing computer algorithms whose outputs improve with experience. A set of sample or "training" data may be provided to a machine learning algorithm, which may learn patterns in the training data that can be used to build a model that is capable of making predictions or decisions (outputs) based on a set of inputs (e.g., new data). Machine learning models may be used to automate the performance of repeated tasks, to filter emails, to provide navigation for unmanned vehicles, and to perform numerous other tasks or actions.

SUMMARY

The present disclosure broadly discloses methods, computer-readable media, and systems for automated vetting machine learning models and features for reuse. In one example, a method performed by a processing system including at least one processor includes detecting that new data has been added to a repository of reusable machine learning models and machine learning model features, applying data protection to the new data, testing the new data for bias, merging at least a portion of the new data with stored data from the repository to build a new machine learning model in which the data protection is preserved, and publishing the new machine learning model in the repository.

In another example, a non-transitory computer-readable medium may store instructions which, when executed by a processing system including at least one processor, cause the processing system to perform operations. The operations may include detecting that new data has been added to a repository of reusable machine learning models and machine learning model features, applying data protection to the new data, testing the new data for bias, merging at least a portion of the new data with stored data from the repository to build a new machine learning model in which the data protection is preserved, and publishing the new machine learning model in the repository.

In another example, a device may include a processing system including at least one processor and a non-transitory computer-readable medium storing instructions which, when executed by the processing system, cause the processing system to perform operations. The operations may include detecting that new data has been added to a repository of reusable machine learning models and machine learning model features, applying data protection to the new data, testing the new data for bias, merging at least a portion of the new data with stored data from the repository to build a new machine learning model in which the data protection is preserved, and publishing the new machine learning model in the repository.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for vetting machine learning models and features for reuse. As discussed above, machine learning models are trained using a set of training data to make predictions or decisions (outputs) based on a set of inputs (e.g., new data). Recent developments allow even individuals with minimal data analysis expertise to build, train, and deploy machine learning models. For instance, the ability to reuse existing machine learning models (or even parts of existing machine learning models) to build new and potentially different machine learning models allows developers to leverage techniques that are already known to work, rather than build new machine learning models completely from scratch. As such, repositories of reusable machine learning models and features (also referred to as "feature stores") are becoming more commonplace.

As the number of reusable machine learning models and features stored in a feature store grows, however, it becomes more difficult to fully vet the contents of the feature store. For instance, two (or more) users may inadvertently upload the same or similar machine learning models or features for reuse, resulting in redundant entries in the feature store and potentially making it more difficult for others to easily locate relevant data during searches. Moreover, many machine learning models may inadvertently produce outputs that are biased or that result in unintended subgroup effects, potentially due to undetected biases in the training data or other sources. However, there may be no way to detect the potential bias in a feature store entry or to alert users to the potential for bias. The inability to fully vet the contents of a feature store may be further compounded by the fact that multiple methods, including a multitude of open source and cloud-based systems, exist to put machine learning models into production.

Examples of the present disclosure provide governance mechanisms for the reuse of machine learning models and features. For instance, examples of the present disclosure may perform binding and testing of machine learning models and features that are provided for reuse. The testing may be performed against other datasets to detect hidden biases or anomalies and to determine when certain types of data should be treated as sensitive (e.g., such that the data values are masked, encrypted, or the like). Data that is identified as sensitive may be protected in an automated manner when reused in future machine learning models. In further examples, the data lineage of machine learning models and features that are provided for reuse may be traced, so that information on data origins can be provided for consideration. These and other aspects of the present disclosure are discussed in greater detail below in connection with the examples of FIGS. 1-3.

Figure 1:
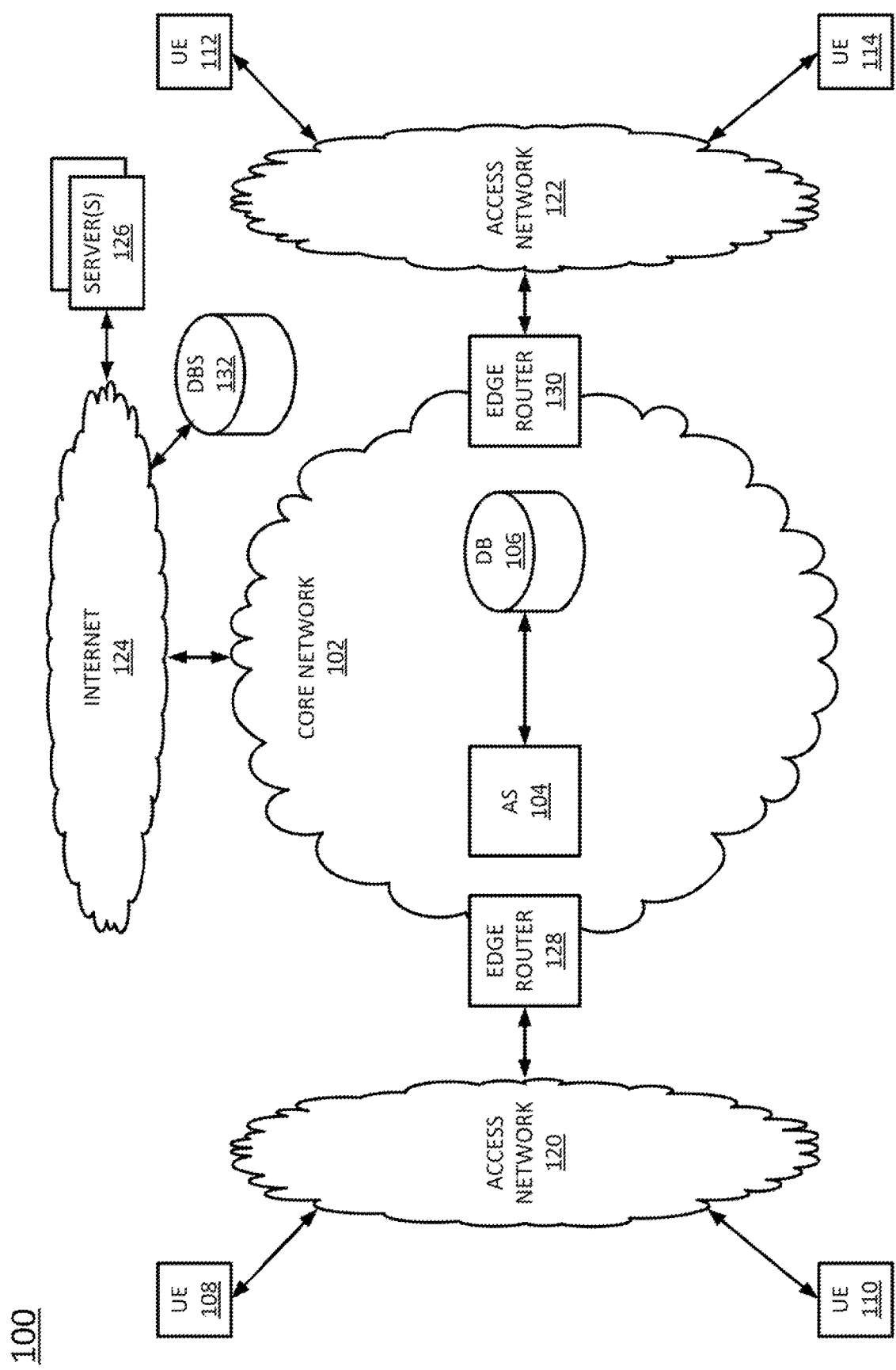
FIG. 1 illustrates an example system in which examples of the present disclosure for vetting machine learning models and features for reuse may operate.

To further aid in understanding the present disclosure, FIG. 1 illustrates an example system 100 in which examples of the present disclosure for building and deploying a machine learning model may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like. In one example, any one of the user endpoint devices 108, 110, 112, and 114 may be operable by a human user to provide guidance and feedback to the AS 104, which may be configured to vet machine learning models and features for reuse, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet content providers, e.g., entities that provide content (e.g., news, blogs, videos, music, files, products, services, or the like) in the form of websites (e.g., social media sites, general reference sites, online encyclopedias, or the like) to users over the Internet 124. Thus, some of the servers 126 and DBs 132 may comprise content servers, e.g., servers that store content such as images, text, video, and the like which may be served to web browser applications executing on the user endpoint devices 108, 110, 112, and 114 and/or to AS 104 in the form of websites.

Figure 3:
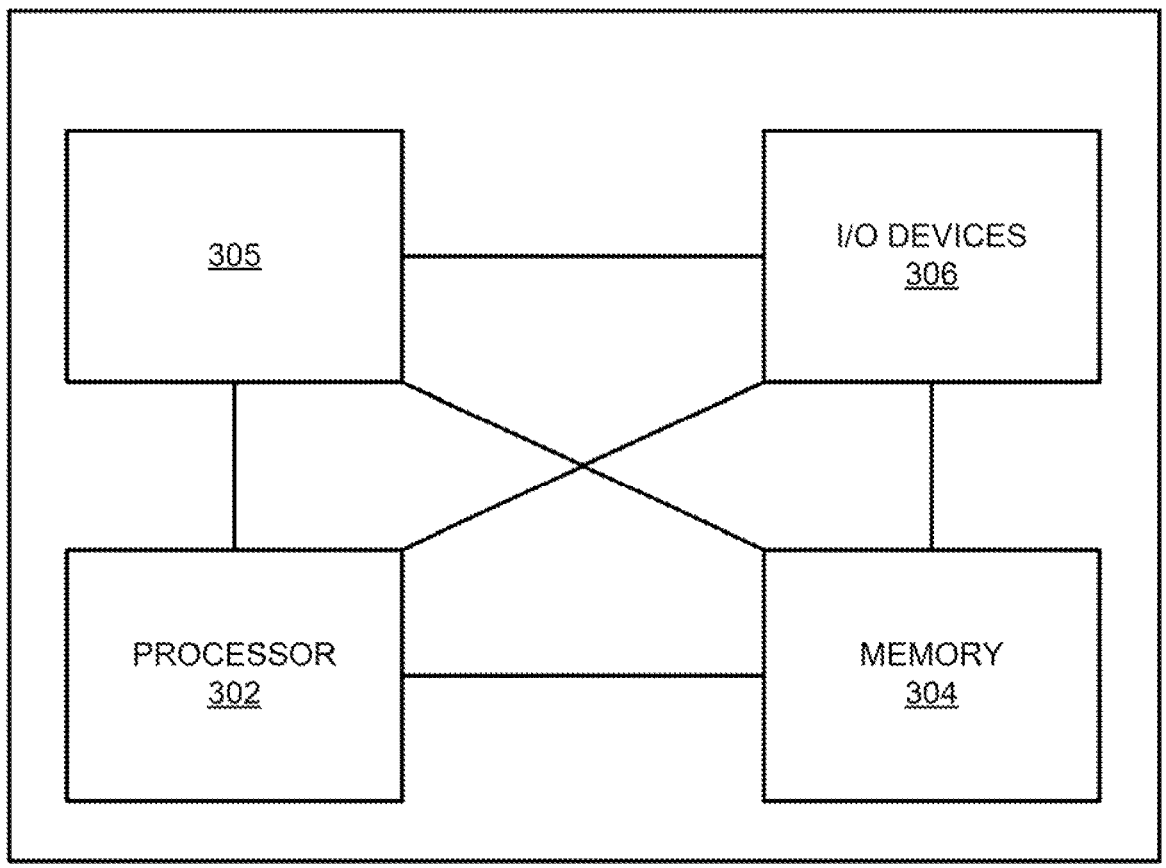
FIG. 3 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for vetting machine learning models and features for reuse, as described herein. The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the AS 104 may be configured to vet machine learning models and features for reuse. In particular, the AS 104 may detect when new data (e.g., machine learning models and/or machine learning model features) are uploaded to the DB 106, and may automatically vet the new data and add or update metadata associated with the new data in order to assist users who may consider reusing the new data when building new machine learning models. For instance, in one example, the AS 104 may be programmed to identify a schema of the new data, which may be used to further identify existing data in the DB 106 which have schemas that are similar to the schema of the new data. The existing data may then be utilized to vet the new data, for example by detecting features of the new data which may be sensitive (e.g., may require protection such as masking, encryption, or the like) or biased. The AS 104 may create an entry for the new data in the DB 106, where the entry may include metadata that indicates which features of the new data have been determined to be potentially sensitive and/or biased. The metadata may also indicate a lineage for the new data (e.g., a source of the new data and/or other machine learning models that are known to have utilized the new data).

Thus, when a user who may be considering reusing the new data reviews the entry for the new data, the user may be provided with information which may help the user to determine whether the new data is suitable for his or her purposes. Moreover, when the new data is reused or merged with other data to build a new machine learning model, the new machine learning model may be built, trained, and deployed in a manner that respects any limitations on the use of the data (e.g., due to sensitivity).

The DB 106 may be configured to ingest machine learning models (and features of machine learning models) from a plurality of sources, including user endpoint devices 108, 110, 112, and 114, DBs 132, the Internet 124, and/or other sources. For instance, users of the user endpoint devices 108, 110, 112, and 114 may upload machine learning models and machine learning model features to the DB 106. The DB 106 may also be configured to pull machine learning models and machine learning model features from other sources, such as DBs 132, the Internet 124, and/or other sources, where permitted. Thus, the DB 106 may function as a "feature store" for a system that supports reuse of machine learning models and machine learning model features. The DB 106 may comprise a proprietary database controlled by an enterprise (e.g., a business, a university, or the like) for internal use or may comprise part of a marketplace or service to which users may subscribe.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for vetting machine learning models and features for reuse as described herein. One example method for vetting machine learning models and features for reuse is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, and so forth. Thus, these and other modifications are all contemplated within the scope of the present disclosure.

Figure 2:
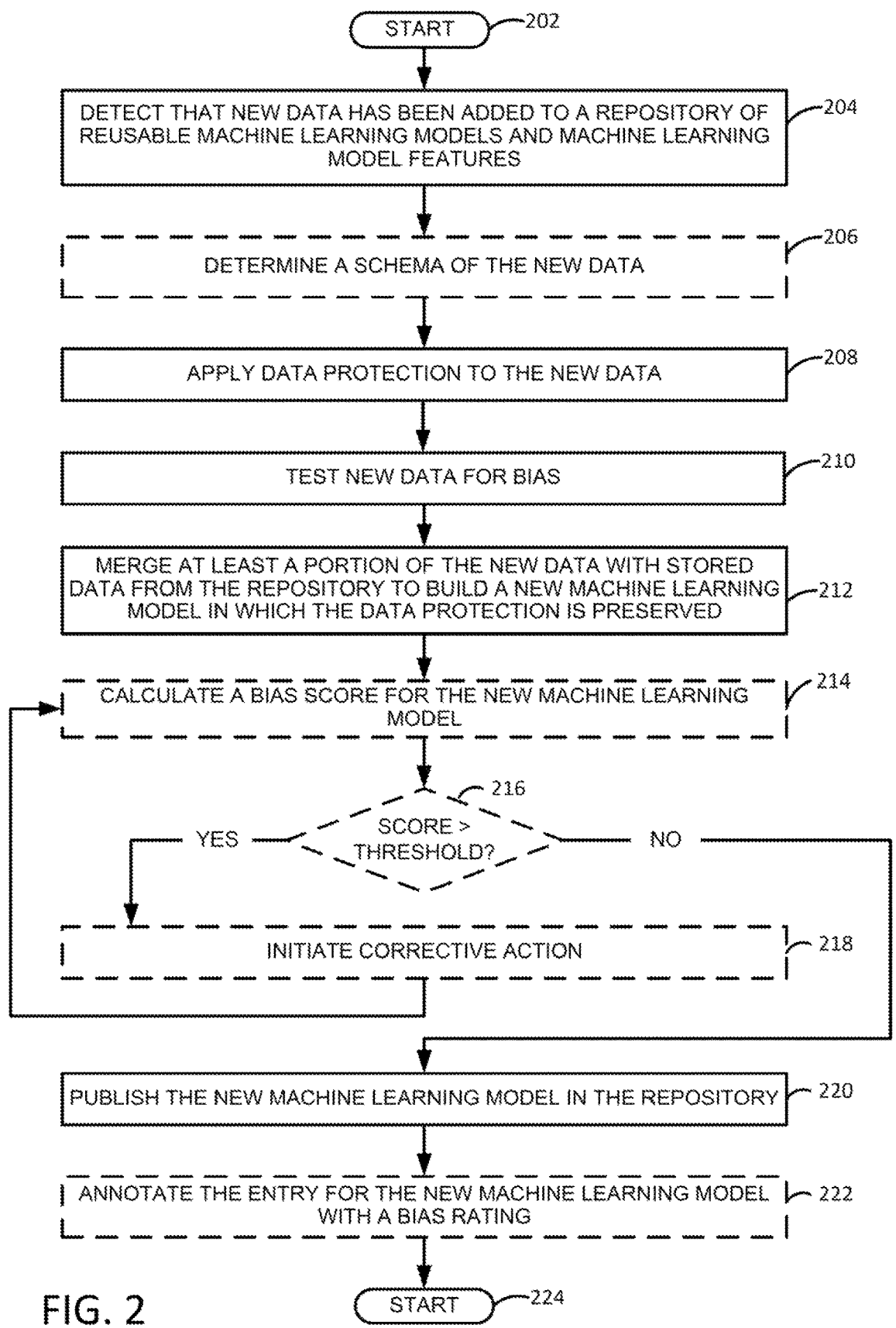
FIG. 2 illustrates a flowchart of an example method for vetting machine learning models and features for reuse, in accordance with the present disclosure.

FIG. 2 illustrates a flowchart of an example method 200 for vetting machine learning models and features for reuse, in accordance with the present disclosure. In one example, the steps, functions and/or operations of the method 200 may be performed by a device as illustrated in FIG. 1, e.g., AS 104 or any one or more components thereof. In another example, the steps, functions, or operations of method 200 may be performed by a computing device or system 300, and/or a processing system 302 as described in connection with FIG. 3 below. For instance, the computing device 300 may represent at least a portion of the AS 104 in accordance with the present disclosure. For illustrative purposes, the method 200 is described in greater detail below in connection with an example performed by a processing system in an Internet service provider network, such as processing system 302.

The method 200 begins in step 202 and proceeds to step 204. In step 204, the processing system may detect that new data has been added to a repository of reusable machine learning models and machine learning model features. In one example, the new data may comprise a machine learning model or a machine learning model feature (e.g., an independent variable that may function as an input to a machine learning model) that has been uploaded to the repository by a user to make available for reuse by other users. The processing system may monitor the repository to detect when the new data is added. For instance, the processing system may be configured to receive a notification when new data is uploaded to the repository. In another example, any data that is uploaded to the repository may be tagged with metadata to indicate a time of upload, and the processing system may periodically query the repository for data having a time of upload that is later than a time of an immediately previous query to the repository (e.g., if the last query was run at 11:00 AM Eastern time, the current query may ask for any data uploaded after 11:00 AM Eastern time).

In optional step 206 (illustrated in phantom), the processing system may determine a schema for the new data. In this context, the "schema" of the new data may comprise all of the features of the new data and the corresponding data types of the features. As an example, a feature of "subscriber occupation" may comprise a column of data in which the types of data values comprise text descriptors of occupations (e.g., "engineer," "nurse," "student," or the like). A feature of "age of subscriber" may comprise a column of data in which the types of data values comprise numbers. Thus, the schema allows the processing system to understand, read, and interpret the new data. In one example, the processing system may detect the schema for the new data by using heuristics or performing specific matching of known values.

In one example, detecting the schema for the new data may include labeling data items whose values may include sensitive information (e.g., information that may be personal, proprietary, or otherwise confidential). For instance the new data may be compared to existing data having a similar schema. If any fields of the existing data are tagged or otherwise marked as sensitive, then the corresponding fields in the new data may be inferred to also be sensitive. In one example, a label indicating that a data item is sensitive may be reviewed for approval or rejection by a human administrator, thereby minimizing any limitations on the new data that may be imposed due to false positives. Machine learning techniques may also be utilized to learn whether certain data values should not just be labeled as sensitive, but should also be hidden for future learning using the new data and/or for unseen schemas.

In another example, detecting the schema for the new data may include identifying existing data having similar schemas to the new data. The existing data may be recommended for reuse, in conjunction with the new data, in a new machine learning model (e.g., as described in further detail below).

In step 208, the processing system may apply data protection to the new data. In one example, the processing system may protect the new data when the new data is determined to be sensitive, e.g., in accordance with the determination of the schema for the new data. In another example, the processing system may protect the new data when there is an indication that the new data is subject to business rules requiring the masking of data (e.g., any new data whose origin matches a specified origin may be masked). In another example, the processing system may protect the new data when an anomaly is detected in the new data (e.g., an anomaly in the rate, values, and/or other components of the new data).

In one example, applying data protection to the new data may involve masking the new data (e.g., modifying the new data in a manner that minimizes the utility of the new data to unauthorized users but does not render the new data unusable by authorized users) or encrypting the new data (e.g., encoding the new data in a manner that is decodable only by authorized users). In another example, applying data protection to the new data may involve setting a flag or metadata tag associated with the new data to alert downstream components of the processing system to not display values of the new data in the outputs of the downstream components (e.g., performance graphs, metrics, or the like). In another example, applying data protection to the new data may involve replacing the new data in-situ with simulated or synthetic data.

In step 210, the processing system may test the new data for bias. In one example, the new data may be tested against external datasets and/or qualifier models in order to detect bias and model drift. For instance, bias could be detected by detecting threshold similarities shared by the new data and stored (e.g., previously uploaded) data that is known to exhibit bias. In another example, feature types (e.g., columns) of the new data could be compared to similar feature types of stored data that is known to exhibit bias. In a further example, the testing may involve validating the new data against a known dataset. The known dataset may, for instance, be provided by a user to validate the new data for a specific use or purpose. In one example, where the new data comprises a complete machine learning model, step 210 may also involve testing the new data for model drift.

In step 212, the processing system may merge at least a portion of the new data with stored data from the repository to build a new machine learning model in which the data protection is preserved. In one example, the stored data may comprise data which was uploaded to the repository prior to the new data being acquired in step 204 (e.g., data from another, previous machine learning model or another, previous set of machine learning model features). The merging of the new data with the stored data preserves the data protection that was applied to the new data in step 208. For instance, in one example, the new machine learning model may include features of the new data which were identified as sensitive or otherwise subject to data protection. In the new machine learning model, these features of the new data may continue to be protected. For instance, in one example, these features may be deployed in the new machine learning model, but the values of these features may be hidden from a user who is building and/or deploying the new machine learning model.

In one example, merging of the data may also include tracing the data lineages of both the portion of the data and the stored data. For instance, the data lineage for given data (e.g., the data detected in step 204 or the stored data) may indicate the origin or source of the given data (e.g., for a mobile phone service provider, whether the given data originated with a retail store operated by mobile phone service provider, a website operated by the mobile phone service provider, or somewhere else). In a further example, the data lineage for given data may also indicate existing machine learning models or machine learning model features that were reused to generate the given data. Metadata associated with the new machine learning model may be updated to indicate the lineages of both the portion of the data and the new data.

In optional step 214 (illustrated in phantom), the processing system may calculate a bias score for the new machine learning model. In one example, calculating the score may involve using known distributions of feature values to test the performance and alignment of the new machine learning model relative to specified bias tests. The bias score calculated for the new machine learning model may reflect a degree of similarity shared by the new machine learning model and the specified bias test (e.g., x percent identical). In another example, a subset of features which are priorities for bias analysis may be identified to the processing system, e.g., by a human administrator or by the creator or owner of the new machine learning model. For instance, the creator of the new machine learning model may identify one or more features which should be tested for bias. The one or more features may include a subset (e.g., less than all) of all of the features of the new machine learning model.

In step 216, the processing system may determine whether the bias score for the new machine learning model exceeds a predefined threshold score. For instance, a maximum permissible bias score may be predefined (e.g., by a human administrator, a creator or owner of the new machine learning model, or the like).

If the processing system determines in step 216 that the bias score for the new machine learning model exceeds the predefined threshold score, then the method may proceed to optional step 218 (illustrated in phantom). In step 218, the processing system may initiate a corrective action. In one example, the corrective action may comprise sending a notification to a human administrator or to the creator or owner of the new machine learning model to alert the human administrator or the creator or owner to the fact that the bias score for the new machine learning model exceeds the predefined threshold. In response, the human administrator or creator or owner may refine the new machine learning model (e.g., by selecting new features to incorporate into the new machine learning model, by retraining the new machine learning model, by adjusting parameters of the algorithm on which the new machine learning model is based, and/or the like).

In another example, the corrective action may comprise an autonomous action taken by the processing system with respect to the new machine learning model. For instance, in one example, the processing system may retrain the new machine learning model. Retraining the new machine learning model may involve selecting new data (e.g., new features, or new values of the same features) to re-run training of the new machine learning model. In another example, the corrective action may comprise rejecting the new machine learning model for inclusion in the repository. In another example, the corrective action may comprise requiring review and approval by a human administrator before the new machine learning model is saved in the repository.

In one example, a corrective action may not be initiated unless a human administrator or the creator or owner of the machine learning model has requested the corrective action when the bias score exceeds the predefined threshold. In other words, in some examples, bias scoring may be used strictly as a means to learn and provide more information about machine learning models and machine learning model features (i.e., for the purposes of informed reuse), but not as a means to exclude machine learning models and machine learning model features from inclusion in the repository.

If, however, the processing system determines in step 216 that the score for the new machine learning model does not exceed the predefined threshold score, then the method 200 may proceed to step 220. In step 220, the processing system may publish the new machine learning model in the repository, e.g., so that the new machine learning model is available to users of the repository for reuse in creating future machine learning models. In one example, publishing the new machine learning model in the repository may include creating an entry for the new machine learning model in the repository.

The entry may include information about the target or use case for the new machine learning model, the schema of the data for the new machine learning model (i.e., the data the new machine learning model takes as input and/or creates as output), other machine learning models which have used features of the new machine learning model or from which the new machine learning model reused features, and/or other information. In one example, if the schema for the data for the new machine learning model was not determined at the time of data acquisition, the processing system may infer the schema for the data for the new machine learning model. For instance, the processing system may trace the lineage of the features which were used to build the new machine learning model in order to infer a schema.

In optional step 222 (illustrated in phantom), the processing system may annotate the entry for the new machine learning model with a bias rating. In one example, the bias rating may be calculated by assigning one point to each feature of the new machine learning model which has been identified as a potential source of bias. As discussed above, reusable features of machine learning models which are stored in the repository may be flagged or tagged with metadata to indicate potential bias. In another example where the features may not have been flagged or tagged to indicate bias, the processing system may analyze the features of the new machine learning model using any of the techniques discussed above with respect to step 210.

Each time the processing system detects such a feature in the new machine learning model, the processing system may assign one point to the new machine learning model. Once all features of the new machine learning model have been analyzed for bias, the processing system may calculate the sum of the points as an overall bias rating for new machine learning model. In one example, the sum may be weighted. For instance, the sum may only be calculated based on points assigned to a subset of features which are determined to be most important for the new machine learning model (e.g., the top x most important features).

In one example, the importance of a feature is defined relative to the use case of the new machine learning model. For instance, for certain machine learning models or use cases, certain features may have a greater impact on the accuracy or the quality of the prediction output. As an example, for a machine learning model that is trained to detect fraudulent mobile phone purchases, a feature such as how often a mobile phone service subscriber logs into their account or how often the user purchases a new phone may have a high level of importance relative to other features. Thus, potential bias in certain features may be critical for some use cases, but less critical for other use cases. Providing an indication of bias that is tied to feature importance allows users to determine what level of bias may be acceptable or not acceptable in a machine learning model that is built for a given use case.

In one example, if the bias rating exceeds a predefined threshold, the processing system may flag the new machine learning model for review by a human administrator. The predefined threshold may be defined, for instance, as an average bias rating calculated from respective bias ratings for all machine learning models in the repository. In another example, the processing system may flag the new machine learning model for review by a human administrator if the total number of points assigned to the new machine learning model (including features that fall outside of the x most important features) exceeds a predefined threshold. In another example, a repository entry for any feature in the new machine learning model that is determined to be a source of potential bias may be updated to indicate the potential bias associated with the feature. For instance, for each feature that is stored in the repository, the corresponding entry may include a field that tracks a number of times that the feature has been identified as a potential source of bias in a machine learning model using the feature. The field may be incremented each time the feature has been identified as a potential source of bias in a machine learning model using the feature.

The method 200 may end in step 224.

The method 200 therefore assists users in reusing existing machine learning models and machine learning model features to build new machine learning models. In one example, new machine learning models and machine learning model features can be ingested into a repository in an automated manner, where the repository stores existing machine learning models and machine learning model features for reuse. Ingest of the new machine learning models and machine learning model features may include automated analysis of the new machine learning models and machine learning model features to identify data schemas, data lineage, sensitive data, and potential biases.

In further examples, the data schemas, data lineage, sensitive data, and potential biases may be identified by metadata, to assist users in identifying potential limitations of the new machine learning models and machine learning model features once the new machine learning models and machine learning model features are stored in the repository. The metadata may also be used to automate protection of sensitive data during reuse. Although the information contained in the metadata may not disqualify the new machine learning models and machine learning model features from inclusion in the repository, the information may help users to make more informed decisions when reusing the new machine learning models and machine learning model features. Moreover, machine learning model features may be scored or ranked by relative importance to the machine learning models in which the machine learning model features are used, to help users understand the impact of certain machine learning model features and associated biases in specific contexts or use cases.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Examples of the present disclosure may prove useful in a variety of areas in which machine learning applications are used. For instance, examples of the present disclosure may be used to learn general feature importance in machine learning models, and to correlate the importances of features to specific contexts (which may be inferred from data schemas). For instance, as discussed above, certain features may be relatively important or have a relatively large influence on a prediction or output when used in one context, but less important or have a relatively small influence on the prediction or output when used in a second context.

In a further example, examples of the present disclosure could be implemented as a plugin for an application programming interface (API) framework, e.g., where future business of machine learning model needs may be added via policies. Reports generated by the API framework may be reviewed (e.g., by a human administrator) prior to deployment of corresponding machine learning models.

In a further example, examples of the present disclosure may be utilized to implement fully automated retraining and governance testing of automated intelligence into production, so that the artificial intelligence becomes truly self-learning.

In a further example, examples of the present disclosure could be offered as a subscription service. Subscribers could provide machine learning models and machine learning model features to the service, and the service could vet the subscriber-provided machine learning models and machine learning model features for bias, data sensitivity, and the like.

In a further example, examples of the present disclosure could be utilized to implement edge node detection and monitoring of machine learning utilized in Internet of Things (IoT) devices. For instance, examples of the present disclosure could be used to validate that computations derived in an IoT system can be applied at the edge of a network and/or in low-compute environments. To deploy the computations at the edge and in the low-compute environments, various machine learning model simplification (or feature ablation) modifications may be implemented (e.g., an IoT system navigating an ambulance vehicle may be trained to ensure that chosen medical procedures are not biased against a demographic, but a full demographic model may not be needed to train for the bias minimization).

In a further example, examples of the present disclosure could be utilized to reverse engineer a machine learning model for data implications. For instance, the inputs and outputs of the machine learning model could be correlated with the inputs and outputs of a previous machine learning model that includes sensitive and/or biased input features.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for vetting machine learning models and features for reuse, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for vetting machine learning models and features for reuse (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for vetting machine learning models and features for reuse (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   detecting, by a processing system including at least one processor, that new data has been added to a repository of reusable machine learning models and machine learning model features;
   applying, by the processing system, a data protection to a first portion of the new data that is determined to be sensitive;
   testing, by the processing system, the new data for bias;
   merging, by the processing system, at least a portion of the new data with stored data from the repository to build a new machine learning model in which the data protection is preserved for the first portion of the new data;
   publishing, by the processing system, the new machine learning model in the repository; and
   annotating, by the processing system, an entry in the repository for the new machine learning model with a bias rating, wherein the bias rating is calculated by assigning one point to each feature of a subset of all features of the new machine learning model which has been identified as a potential source of bias.

2. The method of claim 1, wherein the new data comprises a machine learning model or a machine learning model feature.

3. The method of claim 1, wherein the applying comprises at least one of: masking the first portion of the new data or encrypting the first portion of the new data.

4. The method of claim 1, further comprising:
   determining, by the processing system, a schema for the new data.

5. The method of claim 4, wherein the applying comprises identifying a field in stored data in the repository that corresponds to a field in the first portion of the new data, wherein the stored data has a schema that is similar to the schema for the first portion of the new data, and labeling the field in the first portion of the new data as sensitive when the field in the stored data is marked as sensitive.

6. The method of claim 1, wherein the applying is performed in response to an indication in the new data that the first portion of the new data is subject to a business rule requiring masking of data.

7. The method of claim 1, wherein the applying comprises setting a metadata tag associated with the first portion of the new data to alert downstream components of the processing system to not display values of the first portion of the new data in outputs of the downstream components.

8. The method of claim 1, wherein the applying comprises replacing the first portion of the new data in-situ with synthetic data.

9. The method of claim 1, wherein the merging comprises hiding values of a feature of the first portion of the new data from a user who is building the new machine learning model.

10. The method of claim 1, wherein the merging comprises hiding values of a feature of the first portion of the new data from a user who is deploying the new machine learning model.

11. The method of claim 1, wherein metadata associated with each feature of the new machine learning model indicates that the each feature is a potential source of bias.

12. The method of claim 1, wherein the subset of all features comprises a plurality of features of the new machine learning model which have been identified as most important among all features of the new machine learning model.

13. The method of claim 12, wherein an importance of a feature of the new machine learning model is defined relative to a use case for the new machine learning model.

14. The method of claim 1, wherein the new machine learning model is flagged for review by a human administrator when the bias rating exceeds a predefined threshold.

15. The method of claim 14, wherein the predefined threshold comprises an average bias rating calculated from respective bias ratings for all machine learning models in the repository.

16. The method of claim 1, wherein the first portion of the new data contains data values that include personal information.

17. The method of claim 1, wherein the first portion of the new data contains data values that include proprietary information.

18. The method of claim 1, wherein the first portion of the new data contains data values that include confidential information.

19. A non-transitory computer-readable medium storing instructions which, when executed by a processing system including at least one processor, cause the processing system to perform operations, the operations comprising:
   detecting that new data has been added to a repository of reusable machine learning models and machine learning model features;
   applying a data protection to a first portion of the new data that is determined to be sensitive;
   testing the new data for bias;
   merging at least a portion of the new data with stored data from the repository to build a new machine learning model in which the data protection is preserved for the first portion of the new data;
   publishing the new machine learning model in the repository; and annotating an entry in the repository for the new machine learning model with a bias rating, wherein the bias rating is calculated by assigning one point to each feature of a subset of all features of the new machine learning model which has been identified as a potential source of bias.

20. A device comprising:

a processing system including at least one processor; and a non-transitory computer-readable medium storing instructions which, when executed by the processing system, cause the processing system to perform operations, the operations comprising:

detecting that new data has been added to a repository of reusable machine learning models and machine learning model features;

applying a data protection to a first portion of the new data that is determined to be sensitive;

testing the new data for bias;

merging at least a portion of the new data with stored data from the repository to build a new machine learning model in which the data protection is preserved for the first portion of the new data;

publishing the new machine learning model in the repository; and annotating an entry in the repository for the new machine learning model with a bias rating, wherein the bias rating is calculated by assigning one point to each feature of a subset of all features of the new machine learning model which has been identified as a potential source of bias.

\* \* \* \* \*